United States Patent Office 2,959,516
Patented Nov. 8, 1960

2,959,516
ORGANIC PHOSPHATE COMPOUNDS AND USE THEREOF

Richard Sallmann, Basel, Switzerland, assignor to Ciba Limited, Basel, Switzerland No Drawing. Filed Feb. 3, 1958, Ser. No. 712,634

Claims priority, application Switzerland Aug. 22, 1952

11 Claims. (Cl. 167—22)

This invention provides new organic compounds containing phosphorus which correspond to the general formula

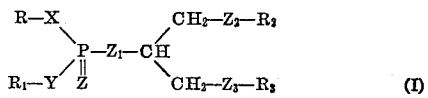
(I)

in which R is selected from the group consisting of (1) lower alkyl radicals (2) phenyl radical (3) substituted phenyl radical and (4) alkylene radicals linked to $R_1$ by a carbon to carbon linkage, $R_1$ is selected from the group consisting of (1) lower alkyl radicals (2) phenyl radical (3) substituted phenyl radical and (4) alkylene radicals linked to R by a carbon to carbon linkage, $R_2$ and $R_3$ each represent a member selected from the group consisting of a lower alkyl radical, a phenyl radical and substituted phenyl radical; X and Y each represent a member selected from the group consisting of —O—, —S—,

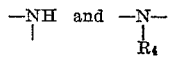

$R_4$ representing a lower alkyl radical, Z, $Z_1$, $Z_2$ and $Z_3$ each represent a member selected from the group consisting of oxygen and sulfur, at least one of the Z's being sulfur.

The new compounds are valuable agents for combating pests and, when of suitable constitution, possess an internal therapeutic or so-salled systemic action.

The radicals R, $R_1$, $R_2$ and $R_3$ in the above formula may be lower alkyl radicals, such as the methyl, ethyl, propyl, isopropyl, butyl and tert. butyl radical. They may further represent a phenyl radical which may be substituted e.g. by halogen atoms or alkyl, alkoxy, nitro or cyano groups, e.g. a tolyl, chlorophenyl or a nitro-phenyl group. $R_2$ and $R_3$ may further together form an alkylene bridge, e.g. an ethylene or a propylene radical.

The new compounds of the above general formula are made in accordance with the invention by various methods which are schematically represented as follows:

(1)
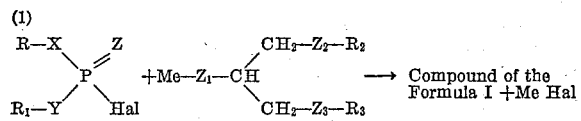
→ Compound of the Formula I +Me Hal (2)
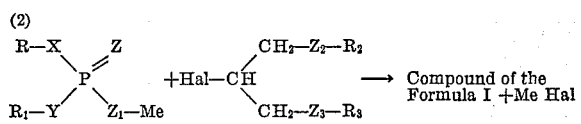
→ Compound of the Formula I +Me Hal (3)
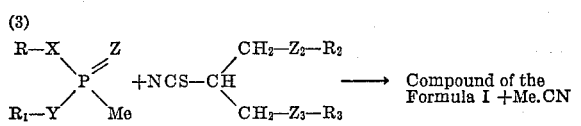
→ Compound of the Formula I +Me.CN In these formulae the symbols have the meanings given above, Hal represents a halogen atom, advantageously a chlorine atom, and Me represents a metal, especially an alkali metal.

Which of the above methods is to be used in any particular case depends on the accessibility of the reaction components required.

It is of advantage to make compounds in which R and $R_1$, on the one hand, and $R_2$ and $R_3$, on the other, represent lower alkyl radicals, and X and Y each represent oxygen. Such compounds correspond to the general formula

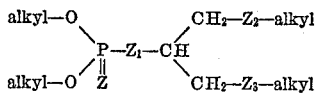

in which Z, $Z_1$, $Z_2$ and $Z_3$ represent oxygen or sulfur, at least one of the Z's being sulfur.

Compounds of this kind are advantageously made by the Method 1 represented schematically above, by reacting a compound of the general formula

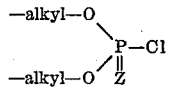

with a compound of the general formula

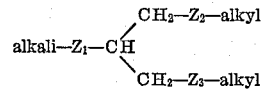

The compounds of the formula

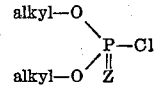

are monochlorides of dialkyl phosphates or dialkyl thiophosphates. There may be mentioned, for example, diethyl chloro-phosphate and diethyl chloro-thiophosphate.

Among the compounds of the general formula

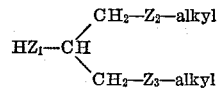

of which the alkali metal salts may be used as reaction components, there may be mentioned 2-hydroxypropane-di-thiol-(1:3)-dimethyl ether-(1:3) of the formula

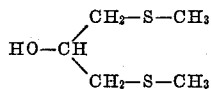

propane-tri-thiol-(1:2:3)-dimethyl ether-(1:3) of the formula

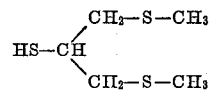

2-hydroxy-propane-di-thiol-(1:3)-diethyl ether-(1:3) of the formula

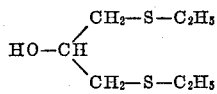

propane-trihydroxy-(1:2:3)-dimethyl ether-(1:3) of the formula

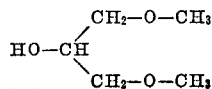

2-mercapto-propane-dihydroxy-(1:3)-diethyl ether of the formula

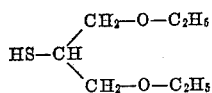

and 2-mercapto-1-ethoxy-3-ethylthio-propane of the formula

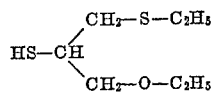

In carrying out the reaction it is of advantage to work at room temperature or a moderately raised temperature and in an inert diluent. As a diluent there may be used, for example, a hydrocarbon such as benzene, toluene etc., chlorobenzene or the like, or a ketone such as acetone, methyl ethyl ketone or methyl propyl ketone. The reaction may be accelerated in known manner by the addition of metallic copper as catalyst.

The new compounds, as stated above, possess valuable properties for combating pests of the insect and acaride kingdom.

The invention, therefore, also includes a method of combating pests of the insect and acaride kingdom with the use of compounds of the above general Formula I. Compounds of the general formula

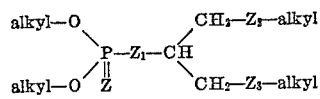

in which "alkyl" represents a lower alkyl radical, and Z, $Z_1$, $Z_2$ and $Z_3$ each represent sulfur, at least one of the Z's being sulfur, exhibit especially favorable properties.

The insects and acarides are combated with the new compounds by the usual methods, for example, by treating the objects to be protected with the compounds in the form of dusting preparations or spraying preparations, for example, as solutions or suspensions prepared with water or a suitable organic solvent such, for example, as alcohol, petroleum, a tar distillate or the like. Aqueous solutions, or aqueous emulsions of organic solvents, which contain the active substances may also be applied by coating, spraying or dipping to the objects to be protected. Such solutions are in particular useful for treating plants or as seed protectants, e.g. for the protection of cotton seeds.

Accordingly, the invention also includes preparations for combating pests, which comprise a compound of the invention in admixture with a liquid or solid inert carrier or diluent.

The spraying or dusting preparations may contain the usual inert filling materials or identification agents such, for example, as kaolin, gypsum or bentonite, or other additions such as sulfite cellulose waste liquor, cellulose derivatives or the like. For improving the wetting or adherent capacity of the preparations there may be added the usual wetting or adherent agents. The pest-controlling preparations may be made up in powdered form, in the form of aqueous dispersions or pastes, or as self-dispersing oils.

The new compounds may be present in the pest-controlling preparations as the sole active substance contained therein, or in conjunction with other insecticides and/or fungicides. Such preparations are used for plant protection by the usual spraying or dusting methods.

The following examples illustrate the invention, the parts being by weight unless otherwise stated, and the relationship of parts by weight to parts by volume being the same as that of the kilogram to the litre.

*Example 1*

8.4 parts of propane-tri-thiol-(1:2:3)-dimethyl ether-(1:3) are added dropwise, while stirring, at 30–40° C. (finally at 50° C.) to a suspension of 1.15 parts of sodium in 40 parts by volume of toluene. When the formation of the sodium salt is complete, 8.6 parts of diethyl chloro-phosphate are slowly added at 20–30° C. After stirring the whole for 2 hours at room temperature, 5 parts of water are added and the precipitated sodium chloride is filtered off. After drying the toluene solution, the toluene is distilled off in vacuo. There are obtained 13.7 parts of a feebly colored oil having the formula

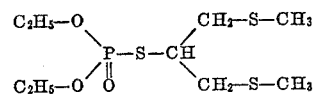

*Example 2*

1.15 parts of sodium are brought into a finely divided form and suspended in 40 parts by volume of toluene. 8.4 parts of propane-tri-thiol-(1:2:3)-dimethyl ether-(1:3) are added dropwise, while stirring, at 30–40° C. (finally at 50° C.). After a short time the formation of the sodium salt is complete. 9.4 parts of diethyl chloro-thiophosphate are then slowly added at 20–30° C., and the reaction mixture is stirred for a further 2 hours at room temperature. After the addition of 5 parts of water, the toluene solution can be freed from sodium chloride. The toluene is distilled off in vacuo. There are obtained 11.2 parts of a colorless oil, which decomposes and becomes dark in color during distillation tests. The product has the formula

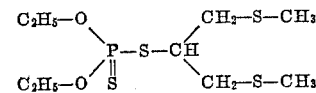

*Example 3*

7.6 parts of 2-hydroxy-propane-dithiol-(1:3)-dimethyl ether-(1:3) are added at 30–40° C. to a suspension of 1.15 parts of pulverized sodium in 40 parts by volume of toluene. Finally the temperature is raised to 40–50° C. for 15 minutes, whereby the formation of the sodium salt is completed. 9.4 parts of diethyl chloro-thiophosphate are added dropwise to the clear solution of the sodium salt at 20° C. After stirring the mixture for 2 hours at room temperature, the sodium chloride is converted into a filterable form by the addition of 5 parts by volume of water. After filtering the mixture, the toluene is distilled in vacuo, and 12.7 parts of a colorless oil remain behind. When it is attempted to distil the oil decomposition occurs with the separation of a dark mass. The product so obtained has the formula

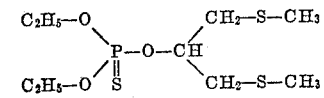

*Example 4*

2 parts of the products obtained as described in Example 1 are mixed with 1 part of the condensation product from 1 mol of octylphenol and about 8–10 mols ethylene oxide and 7 parts of diethylene diglycol. There is obtained a clear solution, which can be emulsified by pouring it into water. In order to test the internal therapeutic or so-called systemic action of the product an Aster stock, heavily attacked by aphides, was sprayed on only one branch with a spraying liquor which contained 0.25 percent of the aforesaid mixture, while other branches were protected from the spray. After a short time, not only were the aphides on the sprayed branch killed, but also those on the branches that were not sprayed.

*Example 5*

A solution of 13.4 parts of diphenyl chloro-phosphate is slowly added while stirring, at 10–20° C. to a solution of 7.6 parts of 2-hydroxy-propane-dithiol-(1:3)-dimethyl ether-(1:3) and 4 parts of pyridine in 30 parts by volume of benzene. The whole is then heated to 60-70° C. for 5 hours while stirring, after which the reaction ceases. For complete separation of the hydrochloric acid pyridine, 30 parts by volume of ether are added, the whole is then filtered, the residue washed with ether, and the filtrate freed from benzene and ether. There are obtained 18.6 parts of a yellowish-colored oil.

*Example 6*

1.15 parts of sodium is finely powdered in 50 parts of xylene. The xylene is replaced by 40 parts by volume of toluene and 8.4 parts of propane tri-thiol-(1:2:3)-dimethyl-ether-(1:3) added dropwise while stirring at 30-40° C. In order to complete the formation of the sodium salt, the temperature is maintained at 50-55° C. for an hour. There are then slowly added 8.5 parts of tetramethyl-diaminochlorophosphate at 20-23° C. After stirring at room temperature for three hours, the reaction is complete. On addition of 5 parts of water, the colloidally dissolved sodium chloride agglomerates and can thus be separated from the toluene solution. After drying the solution with sodium sulfate, the toluene is distilled off in vacuo.

There are obtained 13.9 parts of a slightly yellow-colored oil of the formula

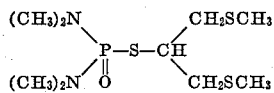

*Example 7*

8 parts of sieved potassium carbonate and 0.3 part of copper powder are added to a solution of 7.6 parts of 2-hydroxy-propane-dithiol-(1:3)-dimethyl ether-(1:3) in 30 parts by volume of dry benzene. At room temperature, 8.6 parts of 1:2-propylenechloro-thiophosphate of boiling point 111-115° C. under 13 mm. pressure (prepared by additively combining sulfur with 1:2-propylenechlorophosphite) are then slowly added drop by drop. After heating to 70-80° C. for 5 hours the reaction is complete. The whole is filtered and the benzene distilled off. There is obtained the product of the formula

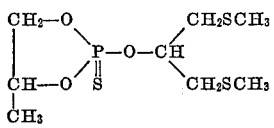

as a faintly yellow-colored oil.

*Example 8*

7.6 parts of 2-hydroxypropane-dithiol-dimethyl ether-(1:3) are added slowly, with stirring, to a suspension of 1.15 parts of powdered sodium in 50 parts by volume of toluene. The mixture is stirred for 1 hour at room temperature. Into the clear solution of the sodium salt there are added dropwise 9.4 parts of diethyl-chloro-thiophosphate, the temperature rising to 45° C. The reaction is completed by heating at 100-105° C. for 3 hours. After cooling, the sodium chloride is eliminated by washing with water. The clear solution is dried with sodium sulfate and the toluene distilled off in vacuo. The oil which remains behind (14.0 parts) distils at 102-105° C. under a pressure of 0.001 mm. It is colorless, insoluble in water, and soluble in organic solvents.

Sulfur: calculated, 31.6%; found, 31.59%; refractive index, $n_D^{25}$ 1.5142.

The product has the formula

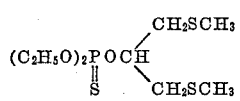

*Example 9*

9.8 parts of propane-trithiol-diethyl ether-(1:3) of boiling point 148-150° C. (under a pressure of 15 mm.) are added dropwise to a suspension of 1.15 parts of sodium in 50 parts by volume of toluene, while stirring, at 35-40° C. Stirring is continued at 50° C. for 1 hour and there is obtained a clear solution of the sodium salt. While cooling, 8.6 parts of diethylchlorophosphate are added at 10-20° C. After stirring for 2 hours at room temperature the reaction is complete; the solution has a neutral reaction. The salts are removed by shaking with water. On drying and distilling off the solvent there are obtained 15.8 parts of a slightly yellow-colored oil. This oil is insoluble in water, and soluble in organic solvents. Under a pressure of 0.004 mm. it distils at 104-110° C. The product has the formula

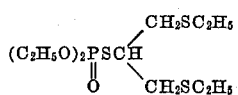

*Example 10*

The product described in Example 9 can also be obtained in the following manner:

9.6 parts of diethyl-phosphite are slowly added, while stirring at 30-40° C., to 1.6 parts of sodium, suspended in 50 parts by volume of toluene. Stirring is continued at 40° C. for 1 hour, after which a clear solution of the sodium salt is obtained. 2.25 parts of finely powdered sulfur are added at 60° C. and stirring continued at 105° C. for 1 hour, the sodium salt of diethyl-thiophosphoric acid being present in finely divided form. There are then added dropwise, while stirring at 50-60° C., 13.8 parts of chloro(2)propane-dithiol-diethyl ether-(1:3) of boiling point 125-128° C. (under a pressure of 12 mm.). The reaction is complete after stirring for 2 hours at 105° C. The product obtained on working up in the usual manner is identical with that of Example 9.

*Example 11*

While stirring, 9.0 parts of 2-hydroxy-propane-dithiol-diethyl ether-(1:3) are run into 1.15 parts of finely distributed sodium in 50 parts by volume of toluene at 10-20° C. Stirring is continued at 30-40° C. until a clear solution of the sodium salt is obtained. 9.4 parts of diethyl-chloro-thiophosphate are added, while stirring, and the reaction is completed by stirring at 100-105° C. for 3 hours. On washing twice with water, drying and distilling off the solvent, 15.6 parts of a weakly yellowish oil are obtained. It boils at 107° C. under a pressure of 0.001 mm.

Sulfur: Calculated, 28.93%; found, 29.79%.

The product has the formula

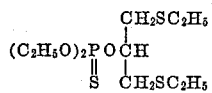

*Example 12*

While stirring at 50° C., 18.8 parts of diethyl-chloro-thiophosphate are added to a mixture of 17.9 parts of hydroxy(2)-propane dithiol-diethyl ether-(1:3) and 32 parts by volume of pyridine. Stirring is continued at 50° C. for 4 hours, the mixture diluted with ether, washed with water, dried with sodium sulfate, and the solvent distilled off. The properties of the resulting product are identical with those of the product of Example 11.

*Example 13*

8.4 parts of propane trithiol-dimethyl ether-(1:3) are added at 35-50° C., while stirring, to 1.15 parts of sodium powder in 50 parts by volume of toluene. After 1 hour, the sodium is dissolved, and to the sodium salt of the mercaptan there are now added dropwise at 10-20° C. 8.6 parts of diethyl-phosphoric acid chloride. After the addition of the chloride, stirring is continued at room temperature for 18 hours, after which the reaction mass has a neutral reaction. On washing with water, drying and distilling off the toluene under reduced pressure there are obtained 15.0 parts of a yellowish colored oil which decomposes when distilled. The product has the formula

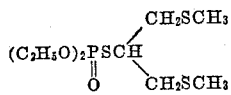

*Example 14*

9.3 parts of dithiophosphoric acid diethyl ester and 8.5 parts of chloro(2)propane dithiol dimethyl ether-(1:3) are dissolved in 50 parts by volume of benzene. The solution is stirred at room temperature while 4.0 parts of pyridine are added. The temperature is raised to 75° C. and maintained at that level for 2 hours. On washing with water, drying with sodium sulfate, and distilling off the benzene, there are obtained 12.0 parts of a yellowish oil which boils at 145° C. under a pressure of 0.02 mm. The product has the formula

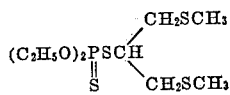

The same product can be obtained by condensing diethyl thiophosphoryl chloride with propane trithiol dimethyl ether-(1:3) of boiling point 82° C. (under a pressure of 0.08 mm.).

*Example 15*

To 1.15 parts of finely divided sodium in 50 parts by volume of toluene there are added first at 30–40° C., while stirring, 9.0 parts of hydroxy(2)-propane dithiol diethyl ether-(1:3) and, when the sodium has dissolved, 8.0 parts of dimethyl thiophosphoryl chloride. The temperature is then raised to 60° C. and maintained at that level for 3 hours. The reaction mass is washed twice with water, the solution dried with sodium sulfate, and the solvent evaporated under reduced pressure. There are obtained 13.6 parts of a slightly brownish colored oil which is insoluble in water. It decomposes when distilled. Boiling point, 83–89° C. under a pressure of 0.01 mm. The product has the formula

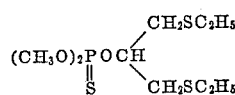

*Example 16*

7.6 parts of hydroxy(2)-propane dithiol dimethyl ether-(1:3) are added dropwise at 15–20° C. to 1.15 parts of finely divided sodium in 50 parts by volume of toluene. After stirring at room temperature for 1 hour, the sodium is in solution. After the addition of 8.0 parts of dimethyl thiophosphoryl chloride the reaction mass is heated at 60° C. for 3 hours, after which the reaction is complete. On working up in the usual manner there are obtained 11.9 parts of a yellowish oil which decomposes when distilled. The product has the formula

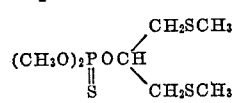

*Example 17*

While stirring at 15–20° C., 8.3 parts of hydroxy(2)-propane dithiol-1-methyl-3-ethyl ether are added to 1.15 parts of finely divided sodium in 50 parts by volume of toluene. After stirring at 30–35° C. for 1 hour, the sodium is in solution. 9.4 parts of diethylthiophosphoryl chloride is then added. The temperature is raised to 100–105° C. and stirring continued for 3 hours to complete the reaction. On washing with water, drying, and distilling off the solvent there are obtained 13.6 parts of a slightly yellow-colored oil which boils at 102–104° C. under a pressure of 0.004 mm.

Sulfur: calculated, 30.20%; found, 30.79%.

The product has the formula

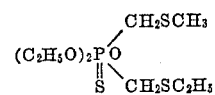

*Example 18*

In the manner described in the preceding examples, 9.0 parts of hydroxy-(2)-propane dithiol-1-methyl-2-isopropyl ether are reacted with 9.4 parts of diethylthiophosphoryl-chloride, and there are obtained 14.8 parts of an oil which boils at 108° C. under a pressure of 0.005 mm. The product has the formula

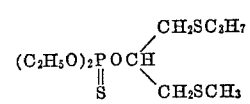

*Example 19*

The reaction of hydroxy(2)propane dithiol-1-methyl-3-isopropyl ether and dimethylthiophosphoryl chloride conducted in the manner described in the preceding examples gives a yellowish colored, water-insoluble oil which decomposes when distilled. The product has the formula

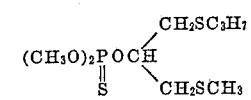

*Example 20*

2 parts of the condensation product of Example 2 or 11 are mixed with 1 part of the condensation product of 1 mol of tertiary octyl-phenol and 8 mols of ethylene oxide, and 7 parts of isopropanol. A clear solution is obtained which can be used as a concentrate for preparing spray liquors and can be emulsified by pouring it into water.

A. In order to demonstrate the intra-therapeutic, so-called systemic, action of the preparation, the following experiment was carried out with the use of a spray liquor having content of active substance of 0.02 percent.

The lower leaves were removed from broad bean plants (*Vicia fabae*) which were heavily infested with aphis (*Doralis fabae*), and a color mark was applied halfway up the stalk of each plant. Then the lower half of the stalk of two plants was sprayed with one of the spraying liquors of one of the above concentrations. After 24 hours the extent to which the aphids had been controlled in the upper non-sprayed part of the plants was examined. The results obtained are given in the following table:

| Spray liquor concentration | Effect on the aphids after 48 hours | |
|---|---|---|
| | Compound of Example 2 | Compound of Example 11 |
| 0.02% | ++ | ++ |

For each plant a sign was used. + means that no living aphids were present. ′ means a good action such that only a few aphids were still alive, and — means an insufficient action or no action.

B. In order to demonstrate the contact action on aphids the following experiment was carried out with the use of a spray liquor having content of active substance of 0.02 percent.

Broad bean plants, which were heavily infested with aphids, were sprayed on all sides and after 48 hours the effect was examined. When a 100% control had been achieved, the plants were freshly infected with aphids, and the effect was examined after a further 48 hours. The results obtained are set out in the following table:

| Spray liquor concentration | Effect on the aphids after— | | | |
|---|---|---|---|---|
| | 48 hours | | 48 hours fresh infection | |
| | Example 2 | Example 11 | Example 2 | Example 11 |
| 0.02% | ++ | ++ | ++ | ++ |

For preparing the spray liquor concentrates other wetting or emulsifying agents than those mentioned above may be used. There may be used non-ionic products, for example, condensation products of aliphatic alcohols, amines, or carboxylic acids containing a long-chained hydrocarbon radical having about 10–30 carbon atoms with ethylene oxide, such as the condensation product of octadecyl alcohol with 25–30 mols of ethylene oxide, or the condensation product of soya bean fatty acid with 30 mols of ethylene oxide, or the condensation product of commercial oleylamine with 15 mols of ethylene oxide, or the condensation product of dodecylmercaptan with 12 mols of ethylene oxide. Among the anion-active emulsifying agents there may be mentioned the sodium salt of dodecyl alcohol sulfonic acid ester, the sodium salt of dodecyl-benzene sulfonic acid, the potassium or triethanol-amine salt of oleic acid or the triethanolamine salt of abietic acid or of a mixture of these acids, or the sodium salt of a petroleum sulfonic acid.

Instead of isopropanol there may be used another solvent for preparing the spray liquor concentrates, for example, ethyl alcohol, methanol, butanol, acetone, methyl ethyl ketone, methyl-cyclohexanol, benzene, toluene, xylene, kerosene, or a petroleum fraction. It will be understood that mixtures of the aforesaid solvents may be used.

*Example 21*

In tests on the action against aphids by the method described under B in Example 20 the compounds of Examples 8, 17 and 19 gave good to excellent results.

The compounds given in Examples 8, 17 and 19 possess a systemic action, when tested according to the experimental procedure A of Example 20.

*Example 22*

20 parts of the products obtained as described in Example 11 are mixed with 9 parts of chalk and 1 part of wetting agent. There is obtained a spray powder, with which spray liquors can be prepared by suspending the powder in water.

Hop plants were treated with such a liquor containing 0.02 percent of the compound of Example 11. All the hop plants were free from aphids and red spiders (Tetranychidae) after a short time.

*Example 23*

There is used a spray liquor which contains, per litre, 1 gram of zinc dimethyl-dithiocarbamate and 0.02 gram of compound of Example 2. Fruit trees are sprayed in the summer with the liquor and a good control is obtained against aphids and scab (Fusicladium).

*Example 24*

5 parts of DDT, 1 part of the compound of Example 11, 10 parts of powdered sulfite cellulose waste liquor, 1 part of the condensation product of 12 mols of ethylene oxide with 1 mol of dodecyl-mercaptan and 83 parts of kaolin were mixed together. In this manner an insecticidal and fungicidal powder was obtained which can be used for the preparations of spraying liquors.

Instead of DDT there may be used another chlorinated insecticide, for example, Dieldrin or Aldrin, or a chlorinated terpene, or a phosphoric acid ester, for example, diethyl para-nitrophenyl thiophosphate. Instead of kaolin, another filler such as talc, chalk, bentonite or diatomaceous earth may be used.

*Example 25*

13.1 parts of hydroxy(2)propane-dithiol-1-(p-chlorophenyl)-3-ethyl-ether (boiling point 141–144° C., under a pressure of 0.01 mm.) are slowly added at 20–30° C. to 1.15 parts of finely divided sodium in 50 parts by volume of toluene. Stirring is then continued at 40° C. for a short time, whereupon a solution of the sodium salt is obtained. At a temperature of 20–30° C., 9.4 parts of diethyl-chlorothiophosphate are added dropwise with stirring. After the addition has been completed, the external temperature is slowly raised to 100–105° C., stirring being continued at this temperature for 3 hours. On washing twice with water and drying with sodium sulfate, the solvent is distilled off in vacuo. The residue is heated for a short period at 80° C. in vacuo under a pressure of 0.1 mm. There remain behind 17.0 parts of a yellowish colored oil which cannot be distilled off.

The obtained product has the following formula:

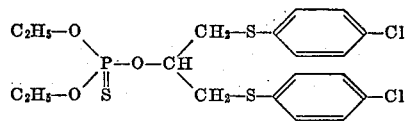

This application is a continuation-in-part of my application Serial No. 374,834 filed August 17, 1953, now abandoned.

What I claim is:

1. The compound of the formula

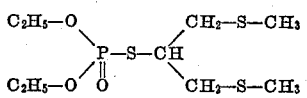

2. The compound of the formula

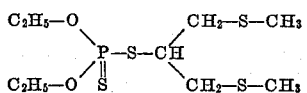

3. The compound of the formula

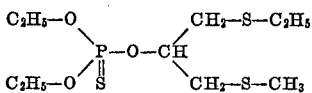

4. The compound of the formula

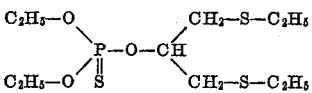

5. The compound of the formula

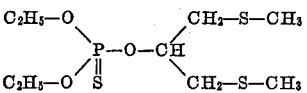

6. A compound containing phosphorus which corresponds to the general formula

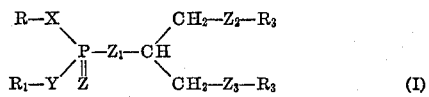

in which R is a member selected from the group consisting of lower alkyl radicals, phenyl radical, and lower alkylene radicals linked to $R_1$ by a carbon-to-carbon linkage; $R_1$ is a member selected from the group consisting of lower alkyl radicals, phenyl radical, and lower alkylene radicals linked to R by a carbon-to-carbon linkage; $R_2$ and $R_3$ each represents a member selected from the group consisting of lower alkyl radical and phenyl radical; X and Y each represents a member selected from the group consisting of —O—, —S—, —NH and —N—, R₄
                        |
                        R₄ representing a lower alkyl radical; Z, Z₁, Z₂ and Z₃ each represents a member selected from the group consisting of oxygen and sulfur, at least one of Z, Z₁, Z₂ and Z₃ being sulfur.

7. A compound containing phosphorus which corresponds to the general formula

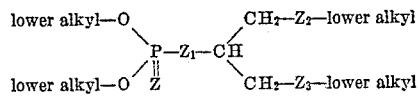

in which Z, Z₁, Z₂ and Z₃ each represents a chalcogen of group VI of the periodic system having an atomic weight of at most 32, at least one of Z, Z₁, Z₂ and Z₃ being sulfur.

8. An insecticidal and acaricidal composition which comprises a phosphorus containing compound of the general formula

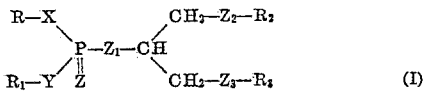

in which R is a member selected from the group consisting of lower alkyl radicals, phenyl radical, and lower alkylene radicals linked to R₁ by a carbon-to-carbon linkage; R₁ is a member selected from the group consisting of lower alkyl radicals, phenyl radical and lower alkylene radicals linked to R by a carbon-to-carbon linkage; R₂ and R₃ each represents a member selected from the group consisting of lower alkyl radical and phenyl radical; X and Y each represents a member selected from the group consisting of —O—, —S—, —NH and —N—, R₄
                        |
                        R₄ representing a lower alkyl radical; Z, Z₁, Z₂ and Z₃ each represents a member selected from the group consisting of oxygen and sulfur, at least one of the Z, Z₁, Z₂ and Z₃ being sulfur, in admixture with an inert carrier.

9. An insecticidal and acaricidal composition which comprises a phosphorus containing compound of the general formula

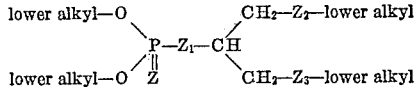

in which Z, Z₁, Z₂ and Z₃ each represents a chalcogen of group VI of the periodic system having an atomic weight of at most 32, at least one of Z, Z₁, Z₂ and Z₃ being sulfur, in admixture with an inert carrier.

10. A method of controlling pests of the insect and acaride kingdom on plants which comprises applying to plants and seeds that are subject to attack by insects and acarides an insecticidal and acaricidal amount of a compound corresponding to the general formula

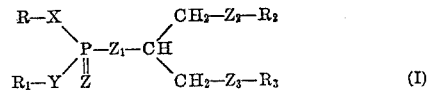

in which R is a member selected from the group consisting of lower alkyl radicals, phenyl radical, and lower alkylene radicals linked to R₁ by a carbon-to-carbon linkage; R₁ is a member selected from the group consisting of lower alkyl radicals, phenyl radical and lower alkylene radicals linked to R by a carbon-to-carbon linkage; R₂ and R₃ each represents a member selected from the group consisting of lower alkyl radical and phenyl radical; X and Y each represents a member selected from the group consisting of —O—, —S—, —NH and —N—, R₄
                        |
                        R₄ representing a lower alkyl radical; Z, Z₁, Z₂ and Z₃ each represents a member selected from the group consisting of oxygen and sulfur, at least one of Z, Z₁, Z₂ and Z₃ being sulfur.

11. A method of controlling pests of the insect and acaride kingdom on plants which comprises applying to plants and seeds that are subject to attack by insects and acarides an insecticidal and acaricidal amount of a compound corresponding to the general formula

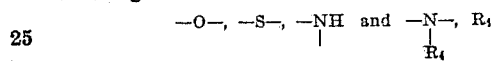

in which Z, Z₁, Z₂ and Z₃ each represents a chalcogen of group VI of the periodic system having an atomic weight of at most 32, at least one of Z, Z₁, Z₂ and Z₃ being sulfur.

References Cited in the file of this patent
UNITED STATES PATENTS

| | | |
|---|---|---|
| 2,565,920 | Hook et al. | Aug. 28, 1951 |
| 2,645,657 | Rudel et al. | July 14, 1953 |
| 2,789,124 | Gilbert et al. | Apr. 16, 1957 |